(12) United States Patent
Bouverie et al.

(10) Patent No.: US 7,375,832 B2
(45) Date of Patent: May 20, 2008

(54) ADJUSTABLE SENSOR ASSEMBLY FOR PRINTERS

(75) Inventors: William M. Bouverie, Windermere, FL (US); Kenneth Colonel, Oviedo, FL (US); Christopher Roy Christensen, Gotha, FL (US); Dwayne Tobin, Longwood, FL (US); Jay Huberty, Gotha, FL (US)

(73) Assignee: Datamax Corporation, Orlando, FL (US)

( * ) Notice: Subject to any disclaimer, the term of this patent is extended or adjusted under 35 U.S.C. 154(b) by 1162 days.

(21) Appl. No.: 10/668,127

(22) Filed: Sep. 22, 2003

(65) Prior Publication Data

US 2004/0156062 A1   Aug. 12, 2004

Related U.S. Application Data

(60) Provisional application No. 60/412,474, filed on Sep. 20, 2002.

(51) Int. Cl.
G06K 1/00 (2006.01)
H04N 1/04 (2006.01)

(52) U.S. Cl. .................... 358/1.12; 358/482; 358/483; 358/497

(58) Field of Classification Search ............... 358/1.12, 358/482, 483, 496, 497, 513, 514; 250/208.1, 250/239
See application file for complete search history.

(56) References Cited

U.S. PATENT DOCUMENTS

| 4,019,935 A | 4/1977 | Harvey |
| 4,795,281 A | 1/1989 | Ulinski, Sr. et al. |
| 5,438,349 A | 8/1995 | Fox et al. |
| 5,507,583 A | 4/1996 | Beaty et al. |
| 5,534,890 A | 7/1996 | Krug et al. |
| 5,563,686 A | 10/1996 | Beaufort et al. |
| 5,564,845 A | 10/1996 | Yamaguchi et al. |
| 5,570,962 A | 11/1996 | Suzuki et al. |
| 5,587,728 A | 12/1996 | Edgar |
| 5,588,761 A | 12/1996 | Seib |
| 5,613,790 A | 3/1997 | Miazga |
| 5,619,240 A | 4/1997 | Pong et al. |
| 5,650,730 A | 7/1997 | Herbst, Jr. |
| 5,802,973 A | 9/1998 | Mueller et al. |
| 6,127,678 A * | 10/2000 | Christensen et al. ......... 250/239 |
| 6,396,070 B1 | 5/2002 | Christensen et al. |
| 6,473,205 B1 * | 10/2002 | Pepe ........................... 358/483 |
| 6,545,266 B2 * | 4/2003 | Lung et al. .................. 250/239 |

OTHER PUBLICATIONS

Patent Abstracts of Japan JP04-112063, Apr. 14, 1992.

* cited by examiner

*Primary Examiner*—Houshang Safaipour
(74) *Attorney, Agent, or Firm*—Carter, DeLuca, Farrell & Schmidt, LLP

(57) ABSTRACT

A print media sensor mounting assembly includes a housing having a sensor mounting element. The sensor mounting element has a sensor position movably mounted therein for movement of the sensor position amongst a plurality of positions corresponding to a width of a print media web.

4 Claims, 9 Drawing Sheets

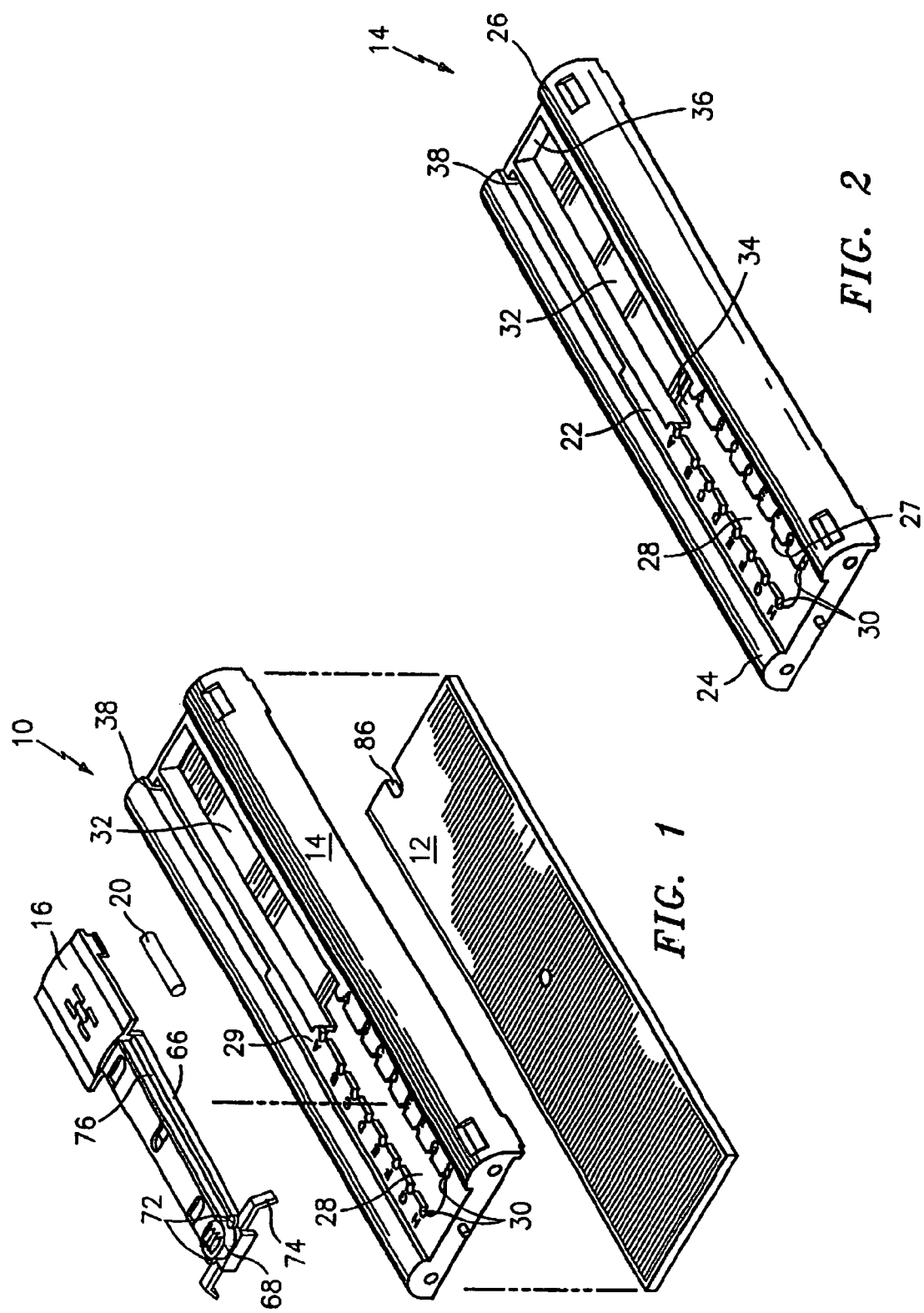

ADJUSTABLE SENSOR ASSEMBLY FOR PRINTERS

CROSS REFERENCE TO RELATED APPLICATIONS

This application claims priority from and the benefits of U.S. provisional application 60/412,474 filed on Sep. 20, 2002.

BACKGROUND OF THE INVENTION

1. Field of the Invention

This disclosure relates to a sensor assembly and, more particularly, to an adjustable sensor assembly for determining the location of at least one edge of print media.

2. Description of the Related Art

Printer sensors are typically used to determine the presence and location of the edge of the print media during operation. The printer requires a reference position in order to begin printing. This ensures that an appropriate location is available in the print area and that edge or over the edge printing does not occur. It is also desirable to be able to distinguish between labels, for example, on a continuous supply roll. The printer, therefore, can determine the appropriate start and finish locations on the print media in order to place a printed bar code, for example, on the appropriate label and advance the print media to the next location in a reliable and efficient manner.

Sensors are used to determine the position of a label within a print head, that is, the distance that the print media has advanced. Traditional optical means of detecting the position of labels, for example, include a "through beam" system wherein an emitter is placed on one side of the label and a detector is placed on the reverse side. There are two methods of using "through beam" technology. These include gap and stripe indication. In the gap indication method, light is passed through the print media and gaps between labels are sensed as a change in light intensity.

Stripe indication senses a black stripe printed on either side of the print media. When the indicator stripe is present, the light from the emitter does not pass through the labels and is not detected by the detectors. Stripe sensing can also be performed from one side of the media. A light source shines on the print media and the reflection is sensed to determine the position of the print media.

In order for the position sensor to work properly the black stripe must be in line with the sensor. When various print media sizes are used, printers are typically provided with an additional sensor at each location for each size of the print media. This increases the complexity and cost for the printer, however, since numerous sensors are needed to accommodate print media of different sizes. Some printers typically require that the single sensor be removed and remounted each time a different size media is used.

Printer versatility is desirable. Therefore, a need exists for a sensor, which can be easily adjusted to allow the use of various sized print media in the printer. A further need exits for such a sensor wherein the sensor is readily accessible and therefore does not require difficult disassembly steps in order to adjust the sensors position.

Prior to the present disclosure, significant advances have been made in the prior art. An example of these improvements is the subject of U.S. Pat. No. 6,396,070 to Christensen et al., the contents of which are hereby incorporated by reference in their entirety.

SUMMARY OF THE INVENTION

A print media sensor mounting assembly includes a housing having a sensor mounting element. The sensor mounting element has a sensor position movably mounted therein for movement of the sensor position to a plurality of predetermined positions corresponding to a width of a print media web.

In particularly preferred embodiments, the printer sensor assembly includes a base defining a slot. A slide, for mounting a sensor therein, is slidably mounted within the slot and has at least one bump. A plurality of detents have predetermined locations formed within the base adjacent to the slot such that the slide is adjustably positioned and releasably secured in a predetermined location when at least one bump engages the detents.

The sensor assembly may include a distal end portion of the slide having lateral extensions extending perpendicularly from a longitudinal axis and engaging a lower surface of the base. The lateral extensions may have at least one bump disposed thereon. The lateral extensions may be used to provide a force for holding bumps within a detent position, wherein the lateral extensions extend downward defining a bowed structure such that when the bowed structure is deflected a force is exerted. A cover plate may be used for attaching to the base such that the bowed structure is deflected to provide a preload force for holding bumps within a detent position. The sensor assembly can include a light sensor.

In another embodiment, the printer sensor assembly includes a sensor base that defines a recess for receiving the sensor, the cable assembly, and the sensor slide. The sensor slide is slidably mounted to the sensor base and is adapted to receive a sensor. The sensor slide includes at least one arm having a button at its distal end for releasably engaging the detents of the sensor base. By releasing the button from the detent and applying motive force along the longitudinal axis of the sensor base, an operator can reposition the sensor slide to sense print media of a different size. The sensor operates in the same manner as in the previous embodiment.

A further embodiment of the sensor assembly replaces the arm and detent structure of the previous embodiment with a threaded rod and wheel structure. The sensor slide is threadably engaged with the threaded rod and moves along the longitudinal axis of the sensor base as the threaded rod is rotated. The operator rotates the wheel that in turn rotates the threaded rod thereby transferring motive force to the sensor slide while the threaded rod is not movable in the longitudinal direction. In lieu of manual rotation of the threaded rod, an electric motor may be coupled to the threaded rod thereby allowing remote signals to control the motor and position the sensor slide in sensor assembly.

BRIEF DESCRIPTION OF THE DRAWINGS

The invention will be described in detail in the following description of embodiments with reference to the following figures wherein:

FIG. 1 is an exploded view showing the components of an adjustable sensor assembly;

FIG. 2 is an isometric view of a sensor base;

DETAILED DESCRIPTION OF THE PREFERRED EMBODIMENTS

Figure 3:
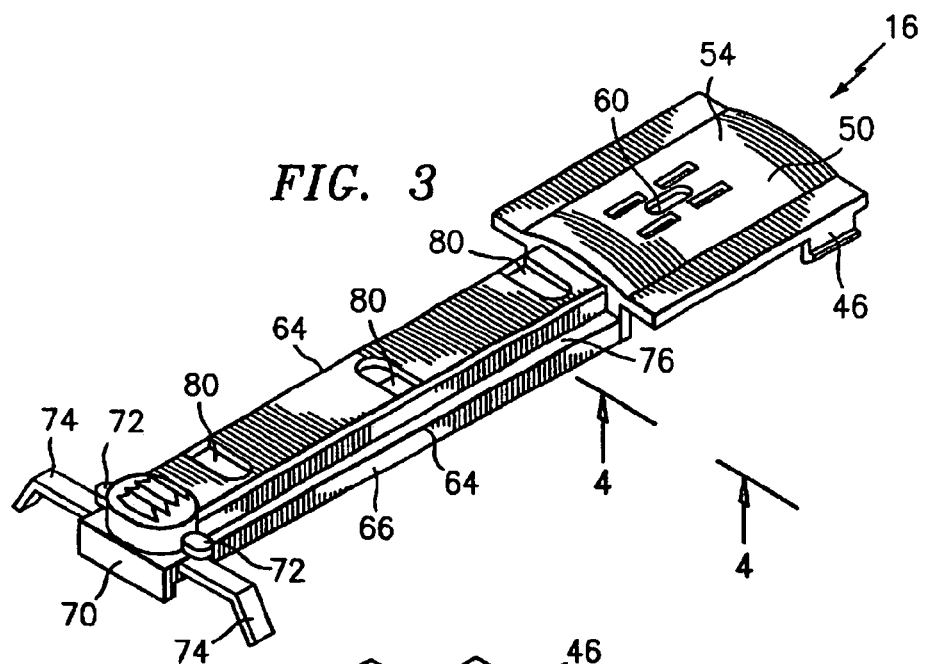
FIG. 3 is an isometric view of a sensor slide.

The present disclosure describes an adjustable sensor assembly for printers. In order to sense the boundaries between labels, for example, or the position of an indicator stripe, sensors are installed inside a printer in an area where a print head is located. The adjustable sensor provides a sensor slide, which adjusts the location of a sensor mounted thereto. A sensor base provides a plurality of preset locations and locks the slide and sensor in place when the desired location is set. The plurality of preset locations corresponds to standard size print media.

Referring now in specific detail to the drawings in which like reference numerals identify similar or identical elements throughout the several views, and initially to FIG. 1, one embodiment of an adjustable sensor assembly constructed in accordance with the present disclosure is shown generally as adjustable sensor assembly 10. Adjustable sensor assembly 10 includes a sensor base 14, a sensor slide 16, a cover plate 12, and a sensor 20.

Referring to FIG. 2, sensor base 14 has a front face 22, first end portion 24, and a second end portion 26. Front face 22 of sensor base 14 has a slot 28 on first end portion 24 with a plurality of opposing detent pairs 30 formed at a lateral boundary 27 of the slot 28. Slot 28 is formed longitudinally through sensor base 14. Front face 22 forms a recess 32 on second end portion 26 along the longitudinal axis of sensor base. Recess 32 extends below front face 22 and remains parallel thereto. Recess 32 forms an open end 34 and a closed end 36. Closed end 36 is located on second end portion 26. Open end 34 leads into slot 28 and communicates therewith. A pair of slots 38 is located adjacent to both side of recess 32 and extend substantially the length of recess 32. The preferred material for sensor base 14 is a moldable polymer.

Figure 4:
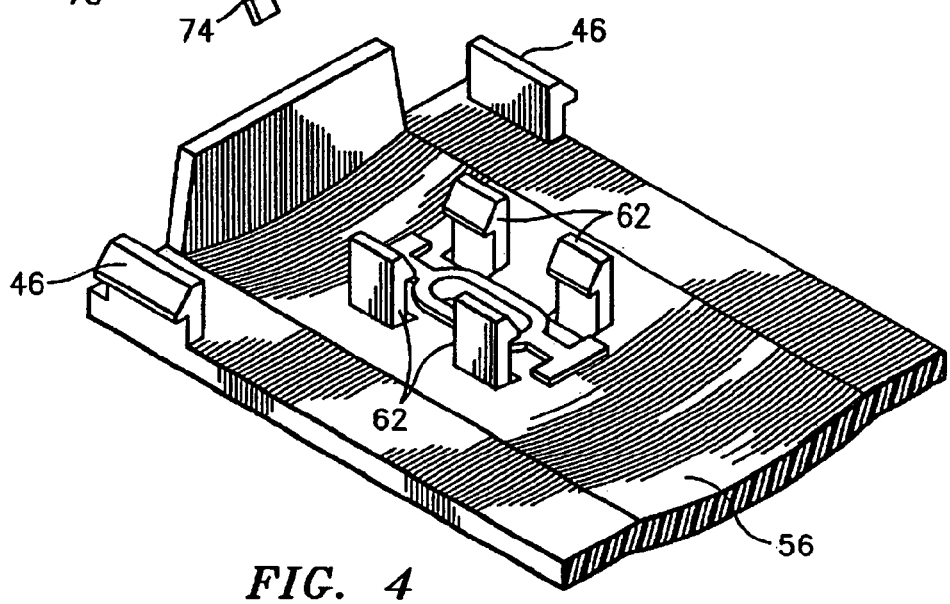
FIG. 4 is an isometric view of a lower surface of a first end portion of the sensor slide shown in FIG. 3.

Referring to FIGS. 3 and 4, sensor slide 16 has a first end portion 50, a second end portion 52, an upper surface 54, and a lower surface 56. Second end portion 52 extends longitudinally from first end portion 50. First end portion 50 has a center hole 60 therethrough and extended clips 62 extending from lower surface 56 for securing a sensor (not shown) adjacent to center hole 60. Center hole 60 is provided to allow light signals to pass therethrough. Power and signals to the sensor are provided through a cable 18. See FIG. 9. The sensor is mounted on lower surface 56 of first end portion between extended clips 62 during operation. Cable 18 is connected to the sensor and is routed longitudinally through the second end portion 52 and secured within sensor slide 16 by wire guides 80. First end portion 50 has extensions 46 extending downward for slidably engaging slot 38 of sensor base 14. Second end portion 52 has lateral sides 64. Each lateral side 64 has a step 66 formed thereon. Second end portion 52 has a finger pad 68 disposed on upper surface 54 adjacent to an end 70 of sensor slide 16. Two bumps 72 are formed on lateral sides 64 on a top surface 76 of steps 66. End 70 also includes lateral extensions 74 disposed perpendicularly from the longitudinal axis and remaining below top surface 76 of steps 66. The preferred material for sensor slide 16 is a moldable polymer.

Referring again to FIG. 1, sensor slide 16 fits into recess 32 and slot 28 such that lateral extensions 74 and top surface 76 of steps 66 engage a lower surface 58 of sensor base 14. See FIG. 5. Extensions 46 clip into slots 38, which act as guides for sensor slide 16 and secure slide 16 to sensor base 14. Sensor base 14 supports sensor slide 16 and allows longitudinal translation between detent pairs 30 of sensor base 14. Opposing pairs of detents 30 are formed to receive two bumps 72 in order to set a location for sensor slide 16 and sensor 20. When cover plate 12 is installed on sensor base 14, lateral extensions 74 engage the surface of cover plate 12. Lateral extensions 74 elastically deflect placing an upward force on second end portion 52 of sensor slide 16. This force maintains bumps 72 in pair of detents 30 locking sensor slide 16 in a fixed location. If adjustment of sensor slide 16 is desired, finger pad 68 is depressed releasing two bumps 72 from pair of opposing detents 30. Sensor slide 16 can now be repositioned and locked in place by releasing finger pad 68 at a new detent position.

In a preferred embodiment, eight pairs of detents 30 are positioned along slot 28. The detents 30 are spaced from a predetermined reference location to allow adjustment of sensor 20 for standard sized print media, for example, bar coded labels. It is contemplated that slot may have more detents 30 to allow more versatility of the printer. Detents 30 are marked to identify each location to provide the user with a set of reference labels 29, for example, letters, to more easily determine the appropriate setting for the print media being used. It is further contemplated that sensor slide 16 can be locked in place at preset positions in a variety of ways. For example, sensor slide can have tabs laterally disposed for locking tabs into recesses within the slot.

Figure 6:
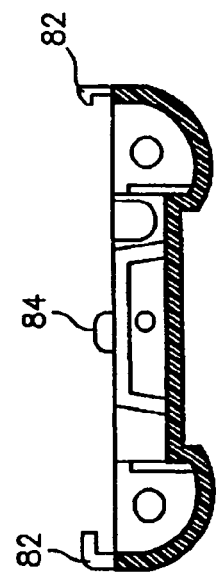
FIG. 6 is a sectional view of the sensor base sectioned along the line indicated in FIG. 5.
Figure 5:
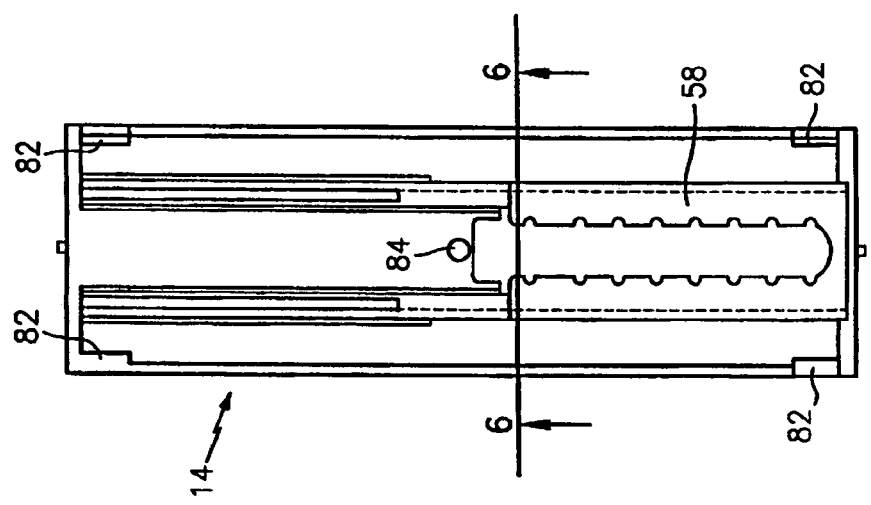
FIG. 5 is a bottom view of the sensor base.

Referring now to FIGS. 5 and 6, cover plate 12 (FIG. 1) is installed onto lower surface 58 of sensor base 14. Lower surface 58 of sensor base 14 is equipped with clips 82 and a pin 84 in order to secure cover plate 12 to sensor base 14. Cover plate 12 defines an opening 86 on one end to allow cable 18 to pass. Sensor base 14 may be mounted to a surface adapted to receive clips 82 and pin 84 without the use of cover plate 12. The surface functions as cover plate 12 providing engagement to lateral extensions 74 to maintain bumps 72 within pair of detents 30.

Figure 7:
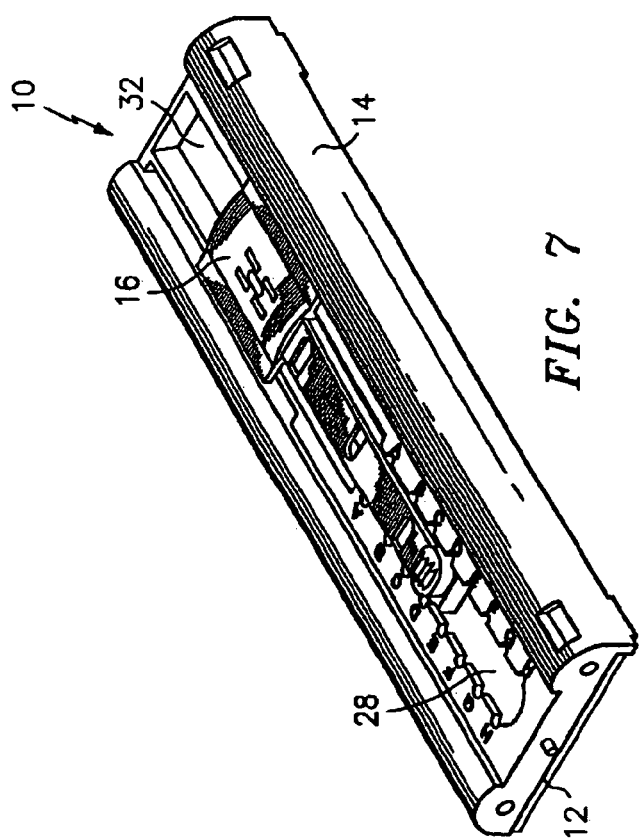
FIG. 7 is an isometric view of an assembled adjustable sensor assembly.

Referring to FIG. 7, an adjustable sensor assembly 10 is assembled showing sensor slide 16 mounted within slot 28 and recess of 32 of sensor base 14. Cover plate 12 is shown mounted to sensor base 14.

Figure 8:
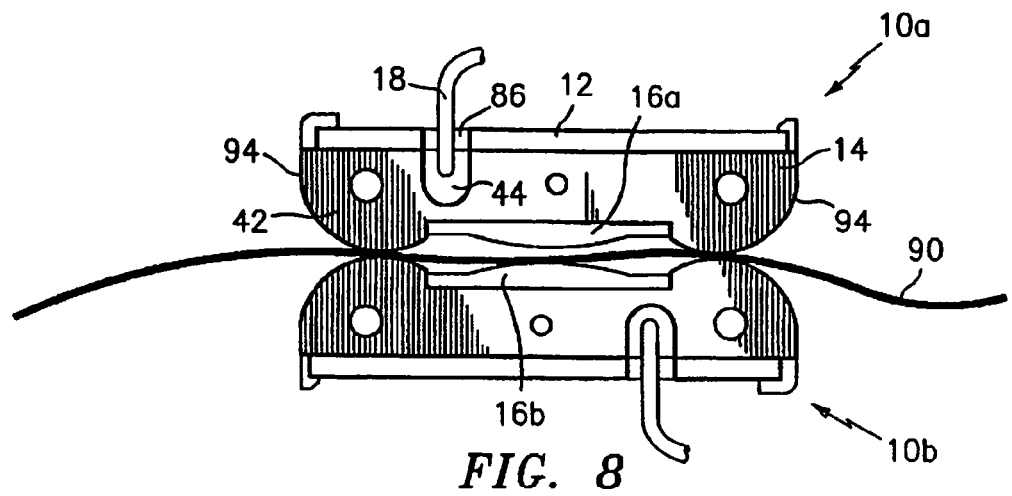
FIG. 8 is an end view of two sensor assemblies in placed in an operative position relative to one another.

Referring to FIG. 8, a working configuration is shown. A first sensor assembly 10a is installed above print media 90 and a second sensor assembly 10b is placed below print media 90. Sensor base 14 has rounded edges 94 to aid in passing print media 90 therebetween. First sensor assembly 10a transmits a light impulse from sensor source (shown as part of sensor 16a) through print media 90 to second sensor assembly 10b where the signal is received by a detector (shown as part of sensor slide 16b). Sensors can be used to determine if print media is present, to read a position indicating stripe, to determine the location of the print media edge or to measure the presence of gaps for labels. When print media is changed, for example, a 4 inch wide label is replaced in printer by a 3.5 inch label. Sensor slides 16a and 16b are repositioned to corresponding detent positions to accommodate the new size of print media 90.

Power and signals to the sensor source and detector are provided through cable 18. Cable 18 is connected to the sensor source or detector and secured within sensor slide 16 by wire guides 80. See FIG. 3. Cable 18 passes around recess 32 to a second end 42 of sensor base 14. Second end 42 defines an opening 44 to allow cable 18 to pass therethrough. Opening 86 in cover plate 12 corresponds to opening 44 and provides additional clearance for cable 18. Slack must be stored within cable 18 to allow adjustment of sensor slide 16 within sensor base 14. This is accomplished by routing cable 18 around recess 32. Cable 18 is similarly routed in second sensor assembly 10b.

It is also contemplated that sensor assembly 10 can be used with a reflected light sensor, in which case, the sensor is both a source and a detector of light, requiring only one sensor assembly 10. In this case, print media 90 passes over sensor assembly 10 reflecting light back to sensor assembly, which is read and processed.

Figure 9:
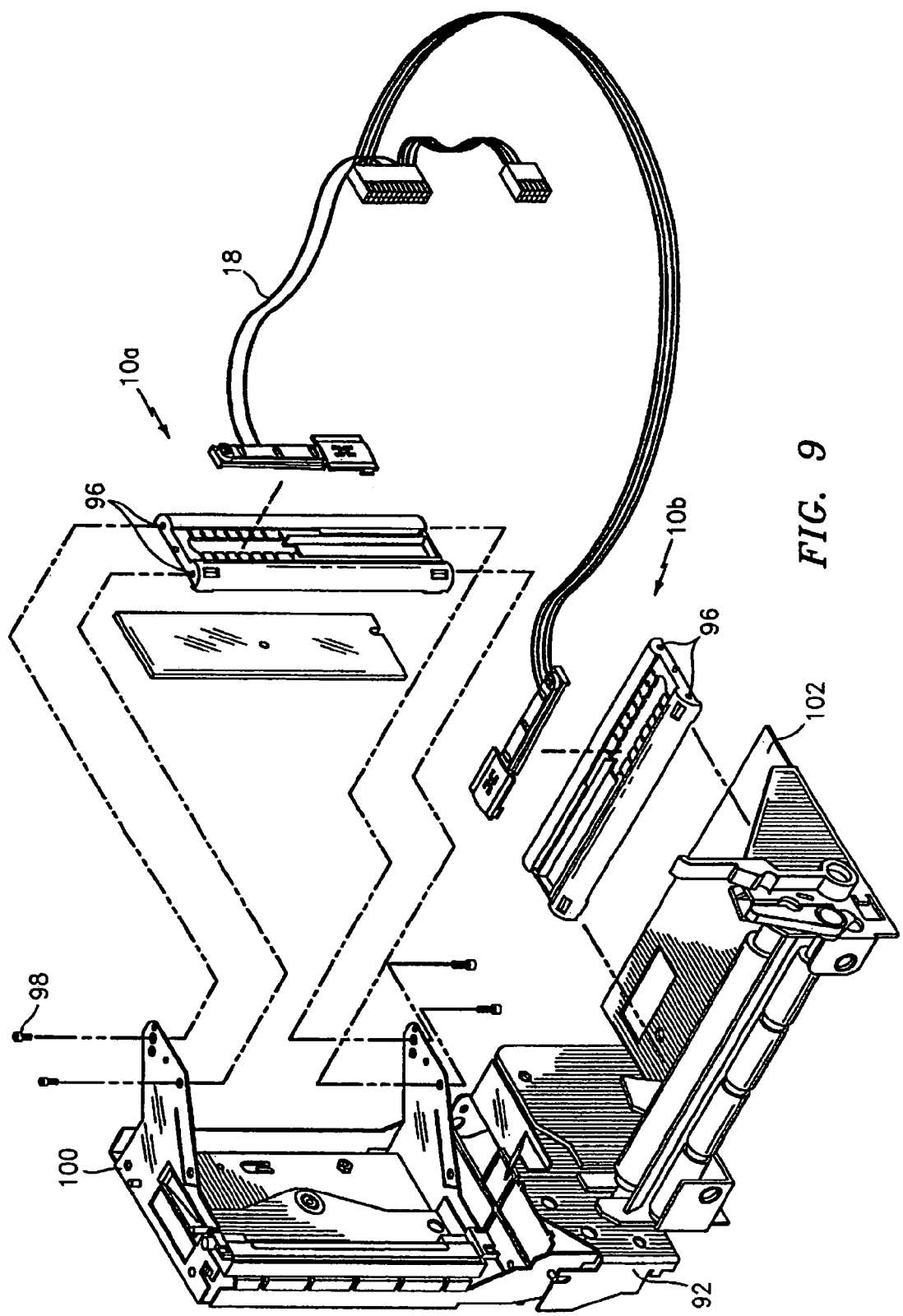
FIG. 9 is an exploded view of two sensor assemblies being installed within a print media feed.

Referring now to FIG. 9, a first sensor assembly 10a is installed above a print media feed 92 and a second sensor assembly 10b is placed below print media feed 92. Sensor assembly 10a and 10b each have a pair of threaded holes 96 at each end for securing to print media feed 92 by screws 98. First sensor assembly 10a mounts to a top 100 of print media feed 92 and second sensor assembly 10b mounts to a bottom 102 of print media feed 92.

Figure 10:
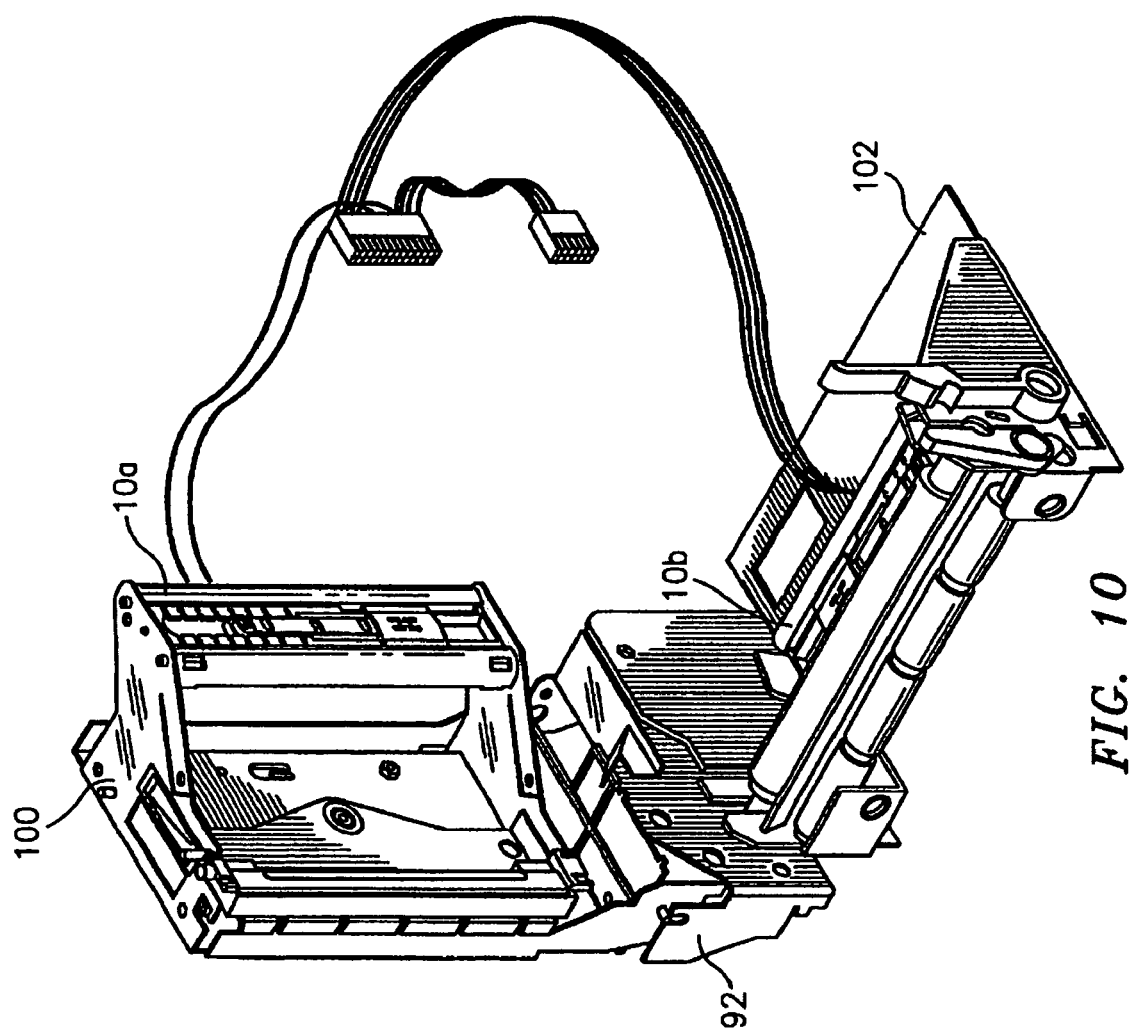
FIG. 10 is an isometric view of two sensor assemblies installed within a print media feed according to a first embodiment of the subject invention.

Referring to FIG. 10, top 100 rotates up to allow access to easily adjust sensor assemblies 10a and 10b. During operation, top 100 is rotated down so that the sensor source of sensor assembly 10a can communicate with the sensor detector of sensor assembly 10b as shown in FIG. 8. In preferred embodiments, a light emitting diode or laser acts as a sensor source.

Figure 11:
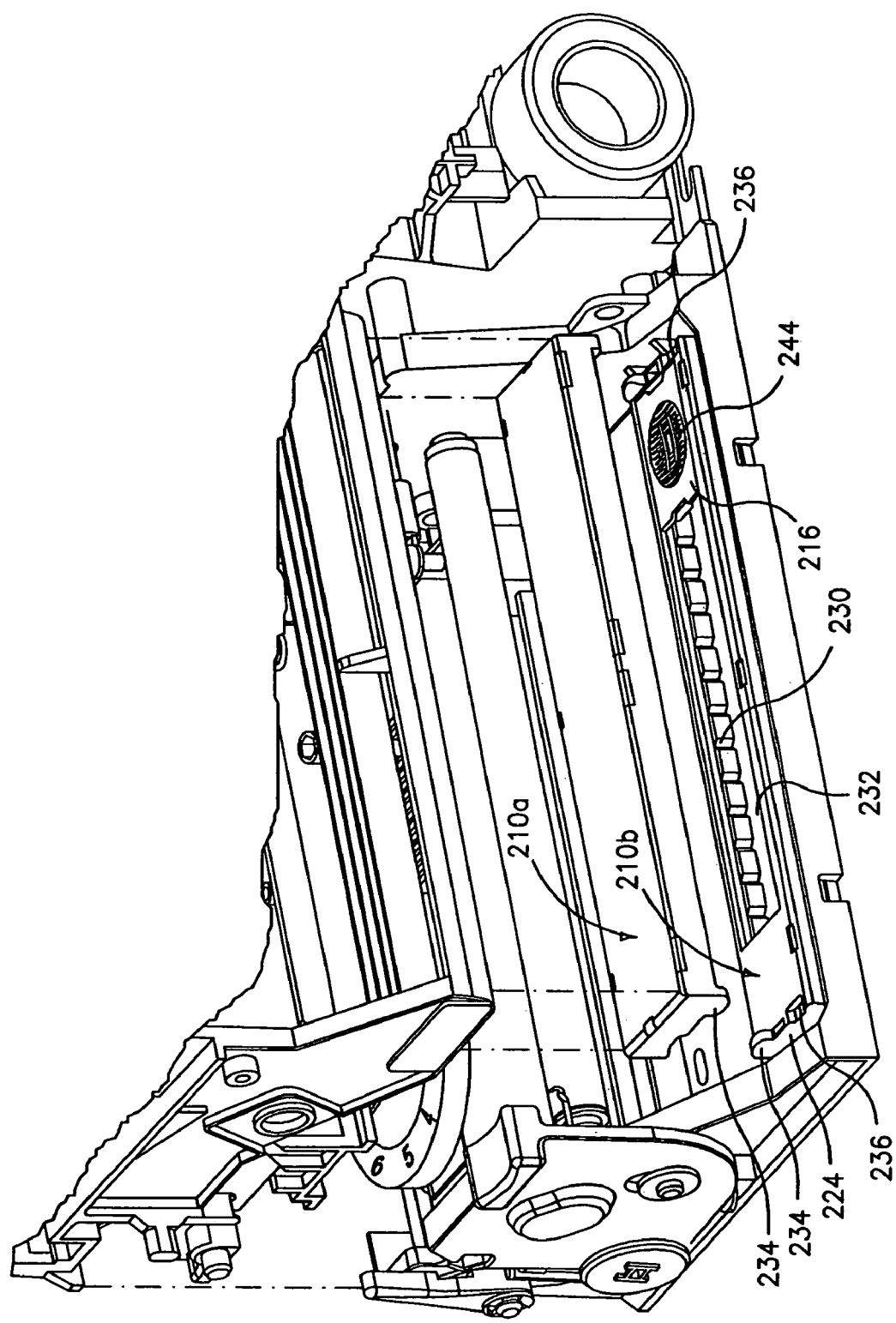
FIG. 11 is a perspective view of two sensor assemblies installed within a print media feed showing a second embodiment of the subject invention.
Figure 13:
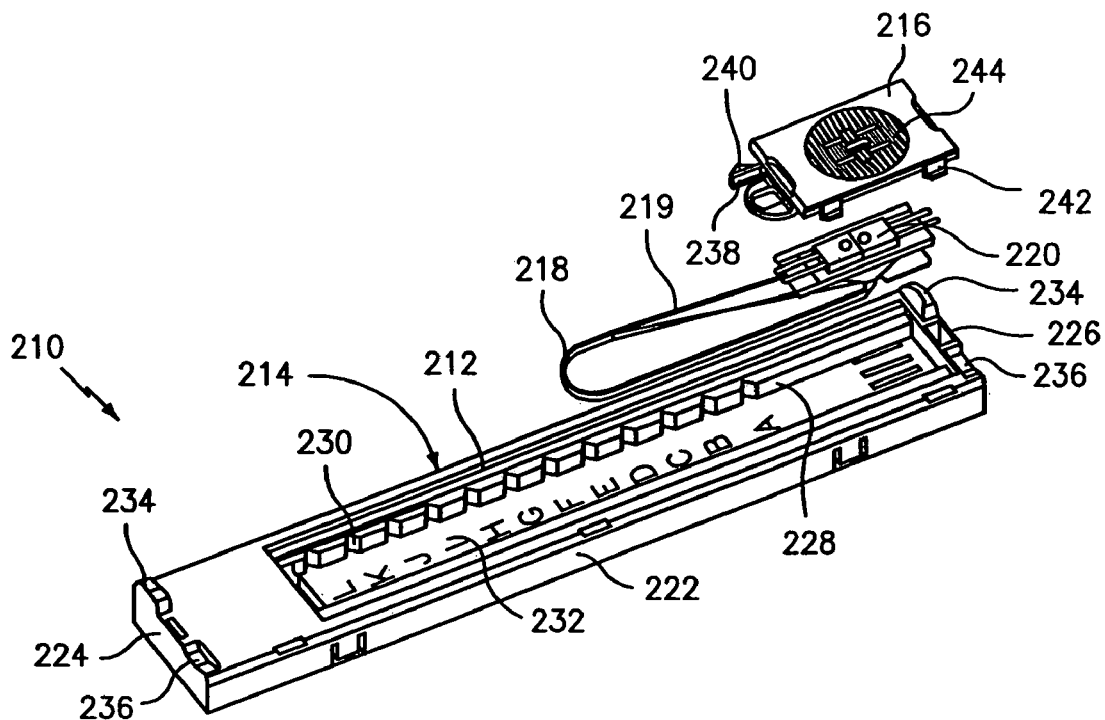
FIG. 13 is an exploded view showing the components of a first embodiment of an adjustable sensor assembly illustrating a first embodiment of the subject invention.

FIGS. 11 and 13 illustrate an additional embodiment of the adjustable sensor assembly 210. Referring to FIG. 11, the sensor assembly, or adjustable sensor assembly, 210 is shown installed in a print media feed. Under normal circumstances, a pair of sensor assemblies 210a, 21b will be installed in a print media feed as shown. Each sensor assembly 210a, 210b includes an elongated sensor base 214 having its longitudinal axis positioned perpendicular to the path of the print media. The sensor base 214 includes a front wall 222 and sidewalls 224, 226 that further define a recess 232. The recess 232 is dimensioned to receive the sensor slide 216. A pair of spaced apart channels 212 is disposed along the longitudinal axis of the sensor base 214 with each channel 212 extending from side wall 226 towards side wall 224 and forming part of the uppermost perimeter of recess 232. A plurality of detents 230 is disposed along interior wall 228 below channel 212.

The sensor 220 and cable assembly 218 are slidably received by the recess 232 for motion along the longitudinal axis of the sensor base 214. Preferably, cable assembly 218 includes flex cable 219 to avoid bunching up of the cable as the sensor 220 moves relative to the sensor base 214. Directly above the sensor 220 is a sensor slide 216 that includes a centrally located grille 244. The grille 244 is centrally located on the sensor slide 216 and has a plurality of slots that permit the transmission of light signals to and from the sensor 220. The operation of the sensors 220 is the same as in the previous embodiment with the data being sent and received along cable 218. In addition, the sensor slide 216 has a number of feet 242 that are slidably engaged in the channels 212 to maintain the relative orientation and position of the system components. A stud 234 and receptacle 236 are disposed on side walls 224, 226 for ensuring the correct physical alignment of the sensor assembly 210a, 210b when it is installed in a print media feed. Each sensor assembly 210a, 210b is constructed and installed such that the stud 234 of the first sensor assembly will positively align with the receptacle 236 of the second sensor assembly 210b, 210a thereby properly aligning the sensors 220 of the respective sensor assemblies 210a, 210b. It is envisioned that other complementary structural combinations could accomplish this as well without departing from the scope of the invention. For example, a complementary arrangement of posts and holes or interleaving arms disposed along the top surface of each sidewall would achieve the same goal.

As in the previous embodiments, the sensor 220 is movable along the longitudinal axis of the recess 232 with a predetermined discrete stop occurring at each detent's 230 position. Along one side of the sensor slide 216 is an arm 238 having a button 240 at its distal end. The arm 238 is flexible and, in its rest position, is sufficiently tensioned such that it moves towards interior wall 228 to ensure positive engagement with each detent 230. To reposition the sensor slide 216, the operator moves the arm 238 so that it deflects away from the interior wall 228 and the button 240 is disengaged from the detent 230. Applying force along the longitudinal axis of the sensor base 214, the operator slides the sensor slide 216 to the desired position and releases the arm 238. The natural tension of the arm 238 causes the button 240 to move towards interior wall 228 and positively engage with the detent 230 for securely positioning the sensor slide 216.

Detection of the print media in this embodiment of the subject invention is identical to that of the first embodiment. Briefly, first and second sensor assemblies 210a, 210b are disposed in the print media feed as shown in FIG. 11. Thusly, the sensor 220 of the first sensor assembly 210a faces the sensor 220 of the second sensor assembly 210b. Sensors can be used to determine if print media is present, to read a position indicating stripe, to determine the location of the print media edge, or to measure the presence of gaps for labels. When print media is changed, sensor slides 216 are repositioned to corresponding detents to accommodate the new size of print media.

Power and signals to the sensor source and detector are provided through flex cable 219. Cable assembly 218 is connected to the sensor source or detector and secured within sensor slide 216. Slack must be stored within cable assembly 218 to allow adjustment of sensor slide 216 within sensor base 214. This is accomplished by routing cable assembly 218 around recess 232. Cable assembly 218 is similarly routed in second sensor assembly 210b.

Figure 12:
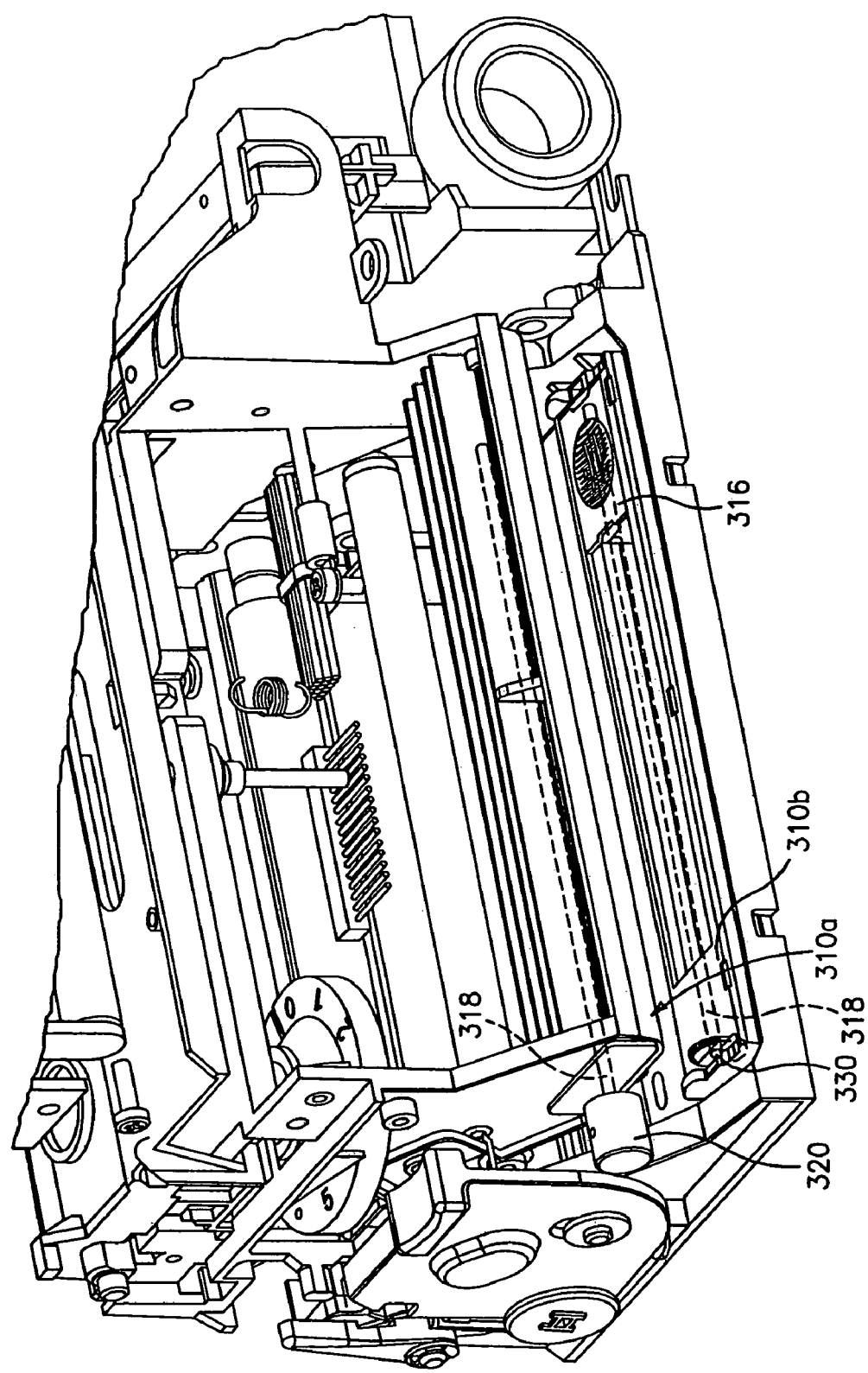
FIG. 12 is a perspective view of two sensor assemblies installed within a print media feed showing a third embodiment of the subject invention.
Figure 13A:
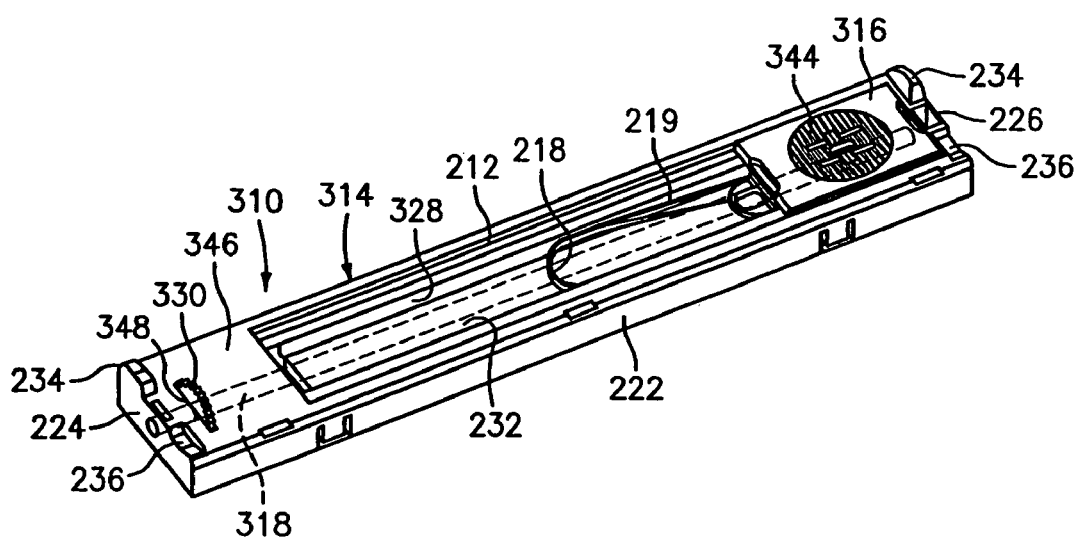
FIG. 13A is an exploded view showing the components of a second embodiment of an adjustable sensor assembly showing a second embodiment of the subject invention.

Referring now to FIGS. 12 and 13A, a further embodiment of the sensor assembly is shown. In lieu of the predetermined positions of the detent style structure, this embodiment utilizes a threaded rod 318 that extends along the length of the sensor assembly 310 and protrudes through sidewall 324. Furthermore, for this embodiment, the flexible arm attached to the sensor slide has been removed and so have the detents along the interior wall. Attached to the threaded rod 318 is a wheel 320 for adjusting the position of the sensor slide 316. In this embodiment, the sensor slide 316 is threadably engaged to the threaded rod 318. As the wheel 320 rotates, the threaded rod 318 rotates and transfers the rotational motion of the threaded rod 318 to the sensor slide 316 and moves it along the longitudinal axis of the sensor assembly 310. This is advantageous because it allows the operator to precisely position the sensor in the recess 232 of the sensor base 314 instead of relying on predetermined detent locations. It is envisioned that the wheel 320 is normally disengaged from the threaded rod 318 and a positive action by the operator is required to engage the threaded rod 318. This arrangement prevents inadvertent motion of the sensor slide 316. For example, the wheel 320 may be spring loaded requiring the operator to push or pull the wheel 320 prior to rotating the threaded rod 318. Alternately, the wheel 320 may be removable and only attached to the end of the threaded rod 318 when repositioning of the sensor slide is necessary. In this instance, the wheel 320 is attached to the end of the threaded rod 318 using a setscrew, cotter pin or other similar structures that positively engage the wheel 320 to the threaded rod 318.

In addition, a gear 330 is disposed in each sensor assembly 310a, 310b and is operatively coupled to each threaded rod 318. As illustrated in FIGS. 12, 13A, and 14A, each gear 330 is configured and adapted to extend vertically through a slot 348 in a top surface 346. Preferably, each gear 330 is disposed substantially adjacent to sidewall 224 and substantially perpendicular to the threaded rod 318. Configured thusly, when the sensor assemblies 310a and 310b are moved towards each other, studs 234 engage recesses 236 to align the sensor assemblies 310a and 310b. Further still, gears 330a, 330b of the first and second sensor assemblies 310a, and 310b releasably engage each other. During operation, rotation of threaded rod 318a in first sensor assembly 310a rotates gear 330a. Since gears 330a and 330b are engaged, as shown in FIG. 14A, rotational motion of gear 330a imparts rotational motion to gear 330b thereby providing rotational motion to threaded rod 318b. Due to the advantageous arrangement of gears 330a, 330b and threaded rods 318a, 318b, sensor slides 316 are moved along the longitudinal axis of the sensor base 314 in unison, thereby maintaining their alignment to each other as they move relative to the sensor base 314.

Except for the alternate means of positioning the sensor slide, the remaining aspects of the sensor assembly operation are as in the previous embodiment. The upper and lower sensor assemblies 310a, 310b are preferably of the type utilizing the threaded rod 318 and wheel 320 arrangements. In addition, the structure employing the threaded rod 318 and wheel 320 assembly is easily adaptable for motorized operation by the optional incorporation of a small electric motor 350, as illustrated in FIG. 14A. Further still, the addition of an electric motor 350 provides the foundation for remotely moving the sensors. By interfacing the electric motor 350 with the associated circuitry of the print media feed and/or the control wiring of the printer, remote signals can reposition the sensor assemblies 310a, 310b individually or in unison.

Figure 14:
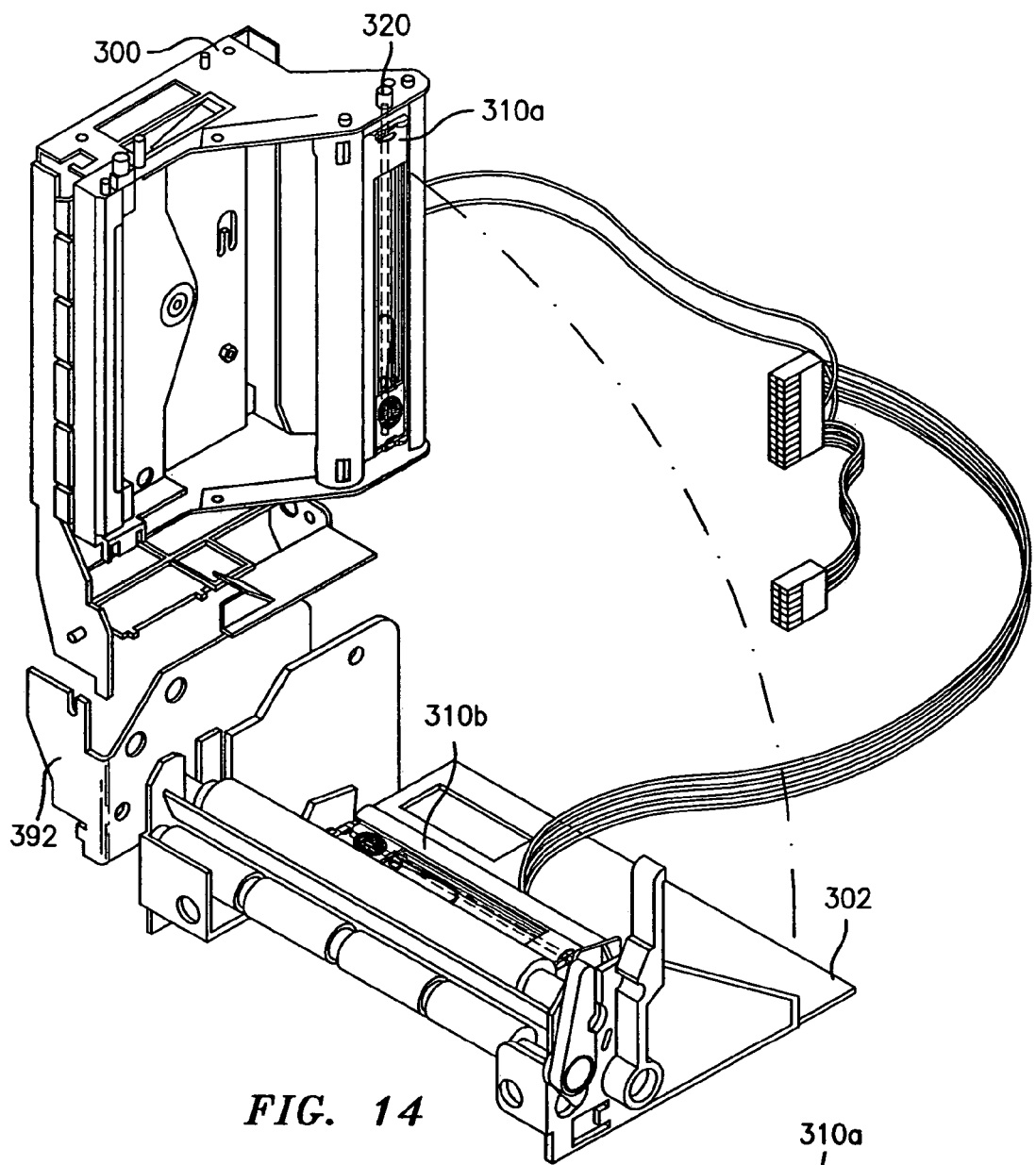
FIG. 14 is an isometric view of two sensor assemblies installed within a print media feed according to a second embodiment of the subject invention.
Figure 14A:
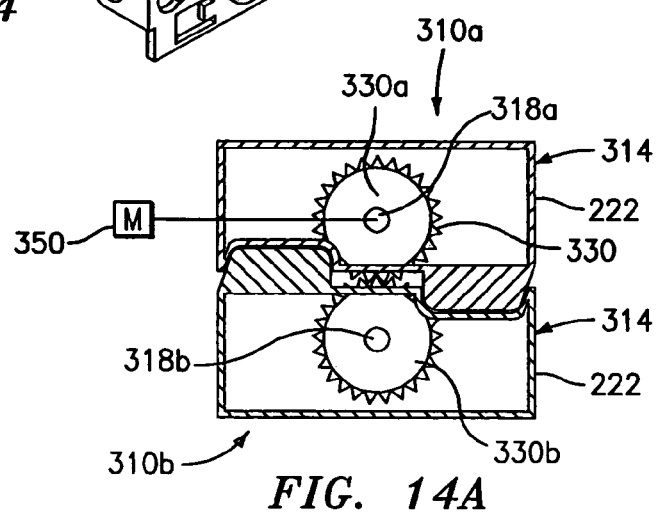
FIG. 14A is a side cross-sectional view of first and second sensor assemblies according to a second embodiment of the subject invention.

Referring now to FIG. 14, a first sensor assembly 310a is installed above a print media feed 392 and a second sensor assembly 310b is placed below print media feed 392. First sensor assembly 310a mounts to a top 300 of print media feed 392 and second sensor assembly 310b mounts to a bottom 302 of print media feed 392. During operation, top 300 is moved generally downward so that the sensor source of sensor assembly 310a can communicate with the sensor detector of sensor assembly 310b. In preferred embodiments, a light emitting diode or laser acts as a sensor source.

Having described preferred embodiments of a novel sensor assembly (which are intended to be illustrative and not limiting), it is noted that modifications and variations can be made by persons skilled in the art in light of the above teachings. For example, it is contemplated that the sensor assembly can have remote adjustment capability. It is therefore to be understood that changes may be made in the particular embodiments of the invention disclosed which are within the scope and spirit of the invention.

What is claimed is:

1. A print media sensor apparatus comprising:

a first adjustable sensor assembly including a first base having a first surface, said first surface including at least one protrusion and at least one recess defined thereon, a first sensor slide having an aperture formed on a surface thereof and a first sensor, said first sensor slide movably mounted in said first base for longitudinal movement of the first sensor amongst a plurality of positions within said first base, a first rotatable elongate member disposed in said base, said first rotatable elongate member configured and adapted to engage said first sensor slide;

a second adjustable sensor assembly including a second base having a first surface, said first surface including at least one protrusion and at least one recess defined thereon, a second sensor slide having an aperture formed on a surface thereof and a second sensor, said second sensor slide movably mounted in said second base for longitudinal movement of the second sensor amongst a plurality of positions within said second base, a second rotatable elongate member disposed in said second base, said second rotatable elongate member configured and adapted to engage said second sensor slide;

means for engaging said first and second rotatable elongate members; and means for rotating at least one of said rotatable elongate members.

2. The print media sensor apparatus of claim 1, wherein the means for engaging includes at least one gear operatively coupled to each rotatable elongate member.

3. The print media sensor apparatus of claim 2, wherein the at least one gear of the first rotatable elongate member is operatively coupled to the at least one gear of the second rotatable elongate member.

4. The print media sensor apparatus of claim 1, wherein the means for rotating includes at least one motor operatively coupled to at least one of the rotatable elongate members.

* * * * *